US009663739B2

(12) United States Patent
Cannella et al.

(10) Patent No.: US 9,663,739 B2
(45) Date of Patent: May 30, 2017

(54) METHOD FOR INCREASING THE MAXIMUM OPERATING SPEED OF AN INTERNAL COMBUSTION ENGINE OPERATED IN A LOW TEMPERATURE COMBUSTION MODE

(71) Applicants: William James Cannella, San Ramon, CA (US); Amir Gamal Maria, San Ramon, CA (US)

(72) Inventors: William James Cannella, San Ramon, CA (US); Amir Gamal Maria, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/891,569

(22) Filed: May 10, 2013

(65) Prior Publication Data
US 2014/0331952 A1    Nov. 13, 2014

(51) Int. Cl.
| | | |
|---|---|---|
| *C10L 10/12* | (2006.01) | |
| *C10L 1/10* | (2006.01) | |
| *F02D 41/30* | (2006.01) | |
| *F02D 41/00* | (2006.01) | |
| *C10L 1/18* | (2006.01) | |
| *C10L 1/23* | (2006.01) | |
| *F02D 19/08* | (2006.01) | |

(52) U.S. Cl.
CPC ............... *C10L 10/12* (2013.01); *C10L 1/10* (2013.01); *F02D 41/0025* (2013.01); *F02D 41/3035* (2013.01); *C10L 1/1811* (2013.01); *C10L 1/23* (2013.01); *C10L 2270/023* (2013.01); *F02D 19/084* (2013.01); *Y02T 10/128* (2013.01); *Y02T 10/36* (2013.01)

(58) Field of Classification Search
CPC .......... C10L 10/12; C10L 1/103; C10L 1/026; F02D 19/0649; F02D 19/081
USPC ........... 123/1 A, 1 R; 44/400, 388, 903, 333, 44/384
See application file for complete search history.

(56) References Cited

U.S. PATENT DOCUMENTS

| | | | | |
|---|---|---|---|---|
| 3,202,141 | A * | 8/1965 | Lovell | ......................... 123/1 R |
| 4,398,505 | A * | 8/1983 | Cahill | .................... C10L 1/232 |
| | | | | 123/1 A |
| 6,981,472 | B2 * | 1/2006 | Bromberg | ............ B01J 19/0006 |
| | | | | 123/27 GE |
| 7,029,506 | B2 * | 4/2006 | Jordan | ..................... C10L 1/14 |
| | | | | 44/307 |

(Continued)

OTHER PUBLICATIONS

Eng, et al. "The Effect of Di-Tertiary Butyl Peroxide (DTEP) Addition to Gasoline on HCCI Combustion", SAE Technical Paper 2003-01-3170 (2003).

(Continued)

*Primary Examiner* — Stephen K Cronin
*Assistant Examiner* — Long T Tran
(74) *Attorney, Agent, or Firm* — Ryan, Mason & Lewis, LLP

(57) ABSTRACT

Disclosed herein is a method for increasing the maximum operating speed of an internal combustion engine operated in a low temperature combustion ignition mode, the method comprising operating the engine with a fuel composition comprising (a) gasoline having a Research Octane Number (RON) greater than 85 and (b) one or more cetane improvers.

26 Claims, 3 Drawing Sheets

(56) References Cited

U.S. PATENT DOCUMENTS

| | | | | |
|---|---|---|---|---|
| 7,131,402 | B2* | 11/2006 | Sobotowski | C10L 1/231 123/1 A |
| 7,920,955 | B2* | 4/2011 | Bauer | F02D 41/3035 123/295 |
| 8,051,828 | B2* | 11/2011 | Sengupta | F02D 41/0025 123/304 |
| 2004/0060229 | A1 | 4/2004 | Todd | C10L 1/143 44/603 |
| 2005/0268883 | A1* | 12/2005 | Sobotowski | C10L 1/231 123/294 |
| 2007/0094919 | A1* | 5/2007 | Haan | C10L 1/026 44/388 |
| 2007/0175090 | A1* | 8/2007 | Haan | C10L 1/026 44/400 |
| 2007/0246005 | A1* | 10/2007 | Sobotowski | G01N 33/2817 123/304 |
| 2008/0306672 | A1* | 12/2008 | Bauer | F02D 41/3035 701/102 |
| 2009/0229175 | A1* | 9/2009 | Shibata | C10L 1/06 44/385 |
| 2009/0283058 | A1* | 11/2009 | Modroukas | F02B 51/02 123/2 |
| 2011/0271925 | A1 | 11/2011 | Cannella et al. | |
| 2012/0012087 | A1 | 1/2012 | Cannella et al. | |

OTHER PUBLICATIONS

Hanson, et al. "Fuel Effects on Reactivity Controlled Compression Ignition (RCCI) Combustion at Low Load", SAE Paper 2011-01-0361 (2011).

Tanaka, et al. "Two-Stage Ignition in HCCI Combustion and HCCI Control by Fuels and Additives", Combustion and Flame, vol. 132, pp, 219-239 (2003).

Zuo-Qin Qian et al, "Characterstics of HCCI Engine Operation for Additives, EGR, and intake charge temperature while using iso-octane as a fuel", Journal of Zhejiang Universiy Science A, vol. 7, No. 2, Aug. 1, 2006, pp. 252-258.

Xiaohiu Gong et al, "Effects of DTBP on the HCCI Combustion Characteristics of SI Primary Reference Fuels", SAE Technical Paper Series, Society of Automotive Engineers, vol. 2005-01-3740, Oct. 24, 2005, p. 12.

Kaddatz, J. et al., "Light-Duty Reactivity Controlled Compression Ignition Combustion Using a Cetane Improver", SAE Technical Paper Series, Society of Automotive Engineers, vol. 2012-01-1110, Apr. 16, 2012.

* cited by examiner

METHOD FOR INCREASING THE MAXIMUM OPERATING SPEED OF AN INTERNAL COMBUSTION ENGINE OPERATED IN A LOW TEMPERATURE COMBUSTION MODE

BACKGROUND OF THE INVENTION

1. Technical Field

The present invention is directed to a method for increasing the maximum operating speed of an internal combustion engine operated in a low temperature combustion mode such as a homogeneous charge compression ignition mode.

2. Description of the Related Art

Internal combustion engines, including diesel engines, gasoline engines, gaseous fuel-powered engines, and other engines known in the art exhaust a complex mixture of air pollutants. Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke. Traditional gasoline engine combustion results in a premixed turbulent flame, while traditional diesel engine combustion results in a mixing controlled diffusion flame. Both processes are controlled by fluid mechanics, as well as heat and mass transfer. Each type of engine has advantages and disadvantages. In general, gasoline engines coupled with 3-way emissions catalysts produce fewer emissions but are less efficient, while, in general, diesel engines are more efficient but produce more emissions.

These air pollutants are composed of particulates and gaseous compounds including, among other things, oxides of nitrogen ($NO_x$). Continued global emphasis and government legislation on reducing emissions and improving fuel economy of internal combustion engines has led to the need to develop advanced high efficiency, clean combustion engines. Exhaust after-treatment systems (such as Selective Catalyst Reduction (SCR), lean $NO_x$ traps, and diesel particulate filters) have been designed and commercialized to lower exhaust emissions of diesel engines to meet emission targets and regulations. However, these systems are costly, add to the weight of the vehicle, and minimize fuel economy due to the added weight, increase in exhaust back pressure, and the need to use fuel to regenerate the systems. Reducing engine-out emissions would decrease the size and/or eliminate the need for these systems.

One approach explored in the industry to simultaneously reduce emissions (compared to a traditional diesel engine) and improve efficiency (compared to a traditional gasoline engine) is to operate the engine at a lower combustion temperature (typically called "low temperature combustion" (LTC)). This can be achieved by premixing some or all of the fuel with the air (and recycled exhaust gas) prior to entering the cylinder, or alternatively, in the cylinder, well before combustion occurs. This, in turn, greatly reduces (or eliminates) the fraction of the fuel that is burned with a mixing controlled diffusion flame (diffusion flames lead to high combustion temperatures). Also, the ratio of the fuel to the total mass in the cylinder is kept low to ensure low temperature combustion. This does greatly reduces the effectiveness of a spark plug. As a result, ignition is normally initiated via compression; however, a spark plug can be used to assist. The low temperature after combustion significantly reduces $NO_x$ formation, due to the fundamental chemistry of the reaction pathway. The use of fuels with gasoline-type volatilities (vs. heavier fuels such as diesel), combined with premixing the fuel and air, limit soot production. Operating with LTC also improves engine efficiency by reducing heat losses, and by allowing the optimization of various engine parameters. There are several types of LTC each of which has a distinct acronym for example: HCCI, PCCI, RCCI, CAI, PPC, MK, UNIBUS, OKP, and the like. One drawback to these LTC-type technologies is that the speed-load (power output) operating range is very limited, and significantly smaller than required and provided for by current gasoline spark-ignited and diesel compression ignition internal combustion engines.

One reason the speed-load range is limited with LTC engines is that it is difficult to control the ignition timing. For example, with respect to the speed range, as the engine speed increases, the fuel has less time to ignite. This is a larger concern for advanced combustion engines since ignition is initiated via compression, and is not initiated solely with a spark plug. Accordingly, as the speed increases in advanced combustion engines, the possibility that the fuel will not ignite (misfire) increases, and the engine becomes unstable (a higher combustion variance). Consequently, the combustion variance dictates the maximum allowable speed for advanced combustion engines.

Ongoing R&D efforts have shown that fuel compositions and their properties can have an impact on the speed-load range that can be obtained. For example, U.S. Patent Application Publication Number 2011/0271925 ("the '925 application") discloses fuel compositions that yield very low soot and low NO emissions while having high efficiencies and acceptable maximum in-cylinder pressure rise rates over a wide load range when used in an advanced combustion engine environment, especially one operating in partially-premixed combustion (PPC) mode. The fuel compositions disclosed in the '925 application have a boiling range of between 95 to 440 degrees Fahrenheit, and (a) a total sum of n-paraffins and naphthenes content of at least 7 volume percent and (b) a preferred RON of about 80 or less.

Another example is U.S. Patent Application Publication Number 20120012087 ("the '087 application") which discloses fuel compositions that provide: (a) a significant reduction in $NO_x$, (b) a reduction in soot emissions, and (c) high efficiencies, especially when compared to conventional diesel fuel compositions, when the fuels of that invention are employed in a partially premixed combustion mode in an advanced combustion engine. The fuel compositions disclosed in the '087 application have a boiling range of between 95 to 440 degrees Fahrenheit, and (a) a total sum of n-paraffins and naphthenes content of at least 22 volume percent and (b) a RON of about 90 or less. The best performing fuels had a RON of 80 or less.

A significant drawback of the use of fuels such as naphthas having lower octane than pump gasoline is that they are present in refineries in much smaller quantities than gasoline and availability for sale at fuel stations would require additional fuel storage tanks which most fuel stations do not have space for. It would therefore be more advantageous, and cost effective, if the conventional pump gasoline could also be formulated to work in these engines. However, due to the higher RON of conventional pump gasoline, the speed range may be affected. It generally takes a longer time to compression ignite higher RON fuels, which can become an issue at higher speeds.

One approach is to use additives to change the reactivity of pump gasoline. Cetane improvers such as 2-ethylhexyl nitrate (EHN) and di-tert butyl peroxide (DTBP) have typically been added to diesel fuels to increase their cetane number. However, the use of cetane improvers in conventional pump gasolines is limited, particularly in LTC processes. For example, SAE Paper 2003-01-3170 by Eng et. al. discloses the use of DTBP to lower the low load stability limit in an HCCI single cylinder engine operated with PRF85 (a mixture of 85% iso-octane and 15% n-heptane, which by definition has a RON=MON=(RON+MON)/2=85). These types of PRF's are frequently used in research to represent gasoline. However, gasoline is known to be a more complex mixture and does not always perform the same as PRF. Further, they state that "adding an ignition promoter to extend the lower fueling rate limit" (i.e. the low load limit) "will result in a corresponding decrease in the maximum fueling level" (i.e. the high load limit).

Another example is SAE paper 2011-01-0361 by Hanson et. al which discloses the addition of EHN to gasoline to lower the low load limit in Reactivity-Controlled Compression Ignition (RCCI). RCCI utilizes two fuels with different reactivities and multiple fuel injections (one port and the other direct injection to create some stratification) to control air-fuel mixture reactivity in engine cylinders.

Combustion and Flame publication (132, (2003), 291-239) by Tanaka et. al. added 0.5 to 2% DTBP and EHN to PRF90 (90% iso-octane+10% n-heptane) and tested fundamental combustion behavior in a rapid compression machine (not an engine). Tanaka et. al. found that the cetane improvers shortened the ignition delay time (i.e., speed up the start of combustion). In addition, Tanaka et. al, reported that DTBP is more effective than EHN.

Heretofore, there has been no appreciation or recognition that the addition of one or more cetane improvers to conventional pump gasoline can increase or expand the engines range of operating speeds and thus improve its performance and feasibility for use in advanced combustion engines.

SUMMARY OF THE INVENTION

In accordance with one embodiment of the present invention, there is provided a method for increasing the maximum operating speed of an internal combustion engine operated in a low temperature combustion mode, the method comprising operating the engine with a fuel composition comprising (a) gasoline having a Research Octane Number (RON) greater than 85 and (b) one or more cetane improvers.

In accordance with a second embodiment of the present invention, there is provided a method for increasing the maximum operating speed of an internal combustion engine operated in a premixed compression ignition combustion mode, the method comprising operating the engine with a fuel composition comprising (a) gasoline having a RON greater than 85 and (b) one or more cetane improvers.

In accordance with a third embodiment of the present invention, there is provided a method for increasing the maximum operating speed of an internal combustion engine operated in a homogeneous charge compression ignition mode, the method comprising operating the engine with a fuel composition comprising (a) gasoline having a RON greater than 85 and (b) one or more cetane improvers.

In accordance with a fourth embodiment of the present invention, there is provided the use of one or more cetane improvers as an additive in a fuel composition comprising gasoline having a RON greater than 85 for increasing the maximum operating speed of an internal combustion engine operable in one of a low temperature combustion mode, a premixed compression ignition combustion mode or a homogeneous charge compression ignition mode.

Among other factors, the present invention is based on the surprising discovery that the maximum operating speed of an internal combustion engine operated in one of a low temperature combustion mode, a premixed compression ignition combustion mode or a homogeneous charge compression ignition mode can be advantageously increased by operating the engine with a fuel composition comprising (a) gasoline having a RON greater than 85 and (b) one or more cetane improvers. At a given engine torque, a higher maximum operating speed can significantly increase the engine power output. Also, a larger engine speed range can improve drivability, and requires a less complex transmission. The use of a cetane improver can increase the maximum operating speed because it has been shown that cetane improvers can reduce the RON of the pump gasoline. This advantageously makes the fuel more reactive, thereby taking less time to ignite under compression ignition conditions. Since there is less time available to ignite at higher engine speeds, a higher reactive fuel is beneficial.

DETAILED DESCRIPTION OF THE PREFERRED EMBODIMENTS

Figure 1:
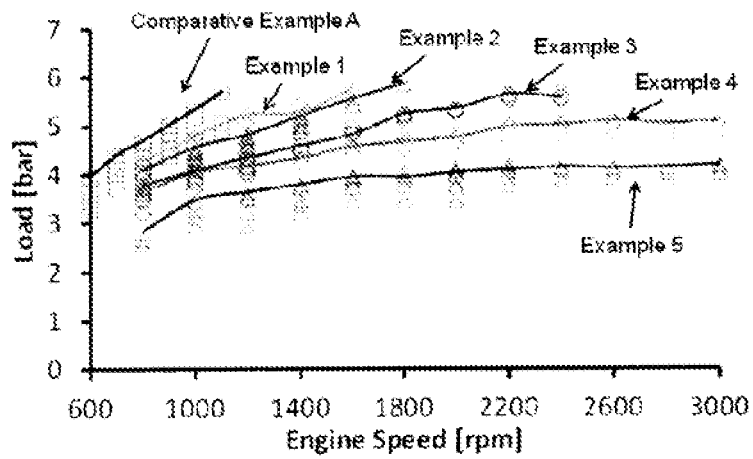
FIG. 1 is a graph illustrating the load versus engine speed for the fuel compositions of Examples 1-5 and Comparative Example A.

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

RON—The Research Octane Number is measured in a specially designed single cylinder CFR engine at an engine speed of 600 rpm and a specified intake air temperature that depends on barometric pressure. It reportedly simulates fuel performance under low severity engine operation.

Advanced Combustion Engines are defined as engines that produce ultra low $NO_x$ or low soot or both. An example of an Advanced Combustion Engine is an internal combustion engine operated in a homogeneous charge compression ignition mode.

Maximum Operating Speed is defined as the maximum engine speed that is achievable for an internal combustion engine operating in one of a low temperature combustion mode, a premixed compression ignition combustion mode or a homogeneous charge compression ignition mode. The maximum operating speed is generally limited by high combustion variance, due to inadequate fuel reactivity. This results when gasoline with a RON greater than 85 is used.

Fuel Composition

The fuel compositions for use in the method of the present invention advantageously increase the maximum operating speed of an internal combustion engine operated in a low temperature combustion mode such as a homogeneous charge compression ignition mode. Preferably, the fuel composition is a gasoline-type fuel composition that is employed in a diesel-type engine. Furthermore, for certain fuel compositions of the present invention, reasonable maximum pressure rise rates can be obtained, thus significantly expanding the range where the engine can be run under advanced combustion conditions satisfactorily.

The fuel composition employed in the present invention includes (a) gasoline having a Research Octane Number (RON) greater than 85 and (b) one or more cetane improvers. In one embodiment, the gasoline employed in the fuel composition has a RON greater than 85 and up to about 120. In another embodiment, the gasoline employed in the fuel composition has a RON greater than 85 and up to about 100. If desired, the gasoline can contain other components such as, for example, ethanol in amount up to about 85 vol. %. In one embodiment, the gasoline contains from about 0.5 up to about 20 vol. % ethanol.

Method of Making the Fuel Composition

The gasoline employed in the presently claimed invention was taken from a commercial refinery. Information about typical processes and conditions for making these fuels can be found in "Petroleum Refining" by William Leffler (PennWell Corp, 2000).

Suitable cetane improvers include, but are not limited to, nitrogen-containing cetane improvers, nitrogen-free cetane improvers, and the like and mixtures thereof. Useful nitrogen-containing cetane improvers include nitrate-containing cetane improvers such as, for example, substituted or unsubstituted alkyl or cycloalkyl nitrates having up to about 12 carbon atoms, or from 2 to 10 carbon atoms, nitrate esters of alkoxy substituted aliphatic alcohols, and the like and mixtures thereof. The alkyl group may be either linear or branched.

Representative examples of alkyl nitrate compounds include, but are not limited to, methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, 2-ethylhexyl nitrate, n-heptyl nitrate, sec-heptyl nitrate, n-octyl nitrate, sec-octyl nitrate, n-nonyl nitrate, n-decyl nitrate, n-dodecyl nitrate, isomers thereof, and the like and mixtures thereof.

Representative examples of cycloalkyl nitrate compounds include, but are not limited to, cyclopentyl nitrate, cyclohexyl nitrate, methylcyclohexyl nitrate, cyclododecyl nitrate, isomers thereof and the like and mixtures thereof.

Representative examples of nitrate esters of alkoxy substituted aliphatic alcohols include, but are not limited to, 1-methoxypropyl-2-nitrate, 1-ethoxypropyl-2 nitrate, 1-isopropoxy-butyl nitrate, 1-ethoxylbutyl nitrate and the like and mixtures thereof. Preparation of the nitrate esters may be accomplished by any of the commonly used methods: such as, for example, esterification of the appropriate alcohol, or reaction of a suitable alkyl halide with silver nitrate.

Useful nitrogen-free cetane improvers include organic compounds containing oxygen-oxygen bonds, such as alkyl peroxides, aryl peroxides, alky aryl peroxides, acyl peroxides, peroxy esters, peroxy ketones, per acids, hydroperoxides, and the like and mixtures thereof. Representative examples of nitrogen-free cetane improvers include, but are not limited to, di-tert-butyl peroxide, cumyl peroxide, 2,5-dimethyl-2,5-di(tertiary butylperoxy) hexane, tertiary butyl cumyl peroxide, benzoyl peroxide, tertiary butyl peracetate, 3,6,9-triethyl-3,9-trimethyl-1,4,7-triperoxononan, 2,2-di(teriary butyl) butane, peroxy acetic acid, tertiary butyl hydroperoxide and the like and mixtures thereof.

In general, the one or more cetane improvers will be added to the fuel composition in an amount ranging from about 0.1 to about 5.0 wt. %. In another embodiment, the one or more cetane improvers will be added to the fuel composition in an amount ranging from about 0.25 to about 50 wt. %.

In one embodiment, the cetane improver and gasoline are contained in separate storage vessels onboard the vehicle and the amount of cetane improver added to the fuel is varied, depending on the specific engine operating parameters such as speed, power level, boost pressure, and % EGR.

Engine

In the case of the low temperature combustion process such as the HCCI combustion process, during the homogeneous charge compression ignition mode of operation, the ignition takes place in the entire combustion chamber almost simultaneously by an auto-ignition of the combustion mixture. The combustion is therefore not initiated by a locally limited ignition source (for example, a spark plug) but is determined only by the ignition conditions in the combustion chamber. The ignition conditions required for this purpose are ensured, for example, by the return of hot residual gas. Outside the homogeneous charge compression ignition mode, the combustion mixture is not ignited by auto-ignition, but by an active (external) igniting by means of an ignition system. The internal combustion engine for use herein can be any internal combustion engine which can operate in the homogeneous charge compression ignition mode. Engines not equipped with turbochargers or superchargers will typically operate at intake pressures of 100 kPa (unboosted, "naturally aspirated" operation). Engines equipped with single or multi-stage turbochargers and/or superchargers will operate from about 100 kPa to about 400 kPa, depending on the type and number of stages. The higher the boost pressure, the more expensive the engine system. In one embodiment, the engine will operate at an intake pressure of 100 kPa. In another embodiment, the engine will operate at an intake pressure ranging from about 100 kPa to about 400 kPa.

The methods of the present invention advantageously increase the maximum operating speed of an internal combustion engine operated in a low temperature combustion process such as the HCCI combustion process by employing a fuel composition comprising (a) gasoline having a RON greater than 85 and (b) one or more cetane improvers, more than 2.5 times as compared to an internal combustion engine operated in a homogeneous charge compression ignition mode employing a fuel composition comprising gasoline having a RON greater than 85 in. the absence of one or more cetane improvers. In another embodiment, the methods of the present invention advantageously increases the maximum operating speed of an internal combustion engine operated in a homogeneous charge compression ignition mode employing a fuel composition comprising (a) gasoline having a RON greater than 85 and (b) one or more cetane improvers, from about 2.5 times to about 6 times as compared to an internal combustion engine operated in a homogeneous charge compression ignition mode employing a fuel composition comprising gasoline having a RON greater than 85 in the absence of one or more cetane improvers.

The following non-limiting examples are illustrative of the present invention.

COMPARATIVE EXAMPLE A

A pump gasoline was used as a control. The main properties of the pump gasoline are listed in Table 1 below.

TABLE I

| | |
|---|---|
| Specific Gravity (15° C.) | |
| Net Heating Value, MJ/kg | |
| Carbon, wt % | 85.0 |
| Hydrogen, wt % | 15.0 |
| Oxygen, wt % | 0.0 |
| RON | 88.4 |
| MON | 82.7 |
| Antiknock Index (R + M)/2 | 85.5 |

EXAMPLE 1

To the pump gasoline of Comparative Example A was added 0.25 wt. % of 2-ethyhexyl nitrate (EHN).

EXAMPLE 2

To the pump gasoline of Comparative Example A was added 0.50 wt. % of EHN.

EXAMPLE 3

To the pump gasoline of Comparative Example A was added 1 wt. % of EHN.

EXAMPLE 4

To the pump gasoline of Comparative Example A was added 2 wt. % of EHN.

EXAMPLE 5

To the pump gasoline of Comparative Example A was added 5 wt. % of EHN.

EXAMPLE 6

To the pump gasoline of Comparative Example A was added 0.50 wt. % of di-tert butyl peroxide (DTBP).

EXAMPLE 7

To the pump gasoline of Comparative Example A was added 1 wt. % of DTBP.

EXAMPLE 8

To the pump gasoline of Comparative Example A was added 2 wt. % of DTBP.

EXAMPLE 9

To the pump gasoline of Comparative Example A was added 5 wt. % of DTBP.

Testing

The fuel compositions of Examples 1-9 and Comparative Example A were tested to determine whether the speed-high load limit can be increased using the Chevron ETC advanced combustion AVL single cylinder research engine. The engine consists of direct fuel injection and a compression ratio of 15:1. For the purpose of this test, the intake temperature was held constant at 40° C. and the intake pressure was held at atmospheric conditions (about 100 kPa).

The load and speed range for each test fuel was then determined as follows. At each speed, the load tested ranged from the low load limit (limited by engine variance of 10%) to the high load limit (limited by engine knock, kept below 3 MW/m). The speed was then increased, and the load range was then tested again at the given speed. The speed was continuously increased until the engine could not operate under a stable condition (limited by engine variance of 10%). This would then represent the maximum speed range.

FIG. 1 shows the operating map using a range of 2-EHN concentrations for the fuel compositions of Examples 1-5. The output load of the engine is shown on the vertical axis, and is represented by the Indicated Mean Effective Pressure (IMEP). The operating engine speed is shown on the horizontal axis. The open points shown on the graph are the actual operating points tested, while the lines represent the maximum operating load (limited by knock at 3 MW/am) for each test fuel and engine speed.

As can be seen, FIG. 1 shows that the maximum speed the engine can operate at with the base fuel of Comparative Example A was 1200 rpm (with a 200 rpm error bar). The speed increased to 3000 rpm (the upper speed limit of the engine used for this test procedure) with the fuel compositions of Examples 4 and 5 containing 2 vol % and 5 vol % of 2-EHN, respectively. A higher maximum operating speed would have been achievable with unrelated modifications to the experimental apparatus (to accommodate the additional vibration). The fuel compositions of Examples 1-3 also had a positive effect, with the engine speed increasing to 1.600 rpm, 1800 rpm, and 2400 rpm, respectively. In addition, as the amount of 2-EHN increased, the engine was able to operate at lower loads.

Figure 2:
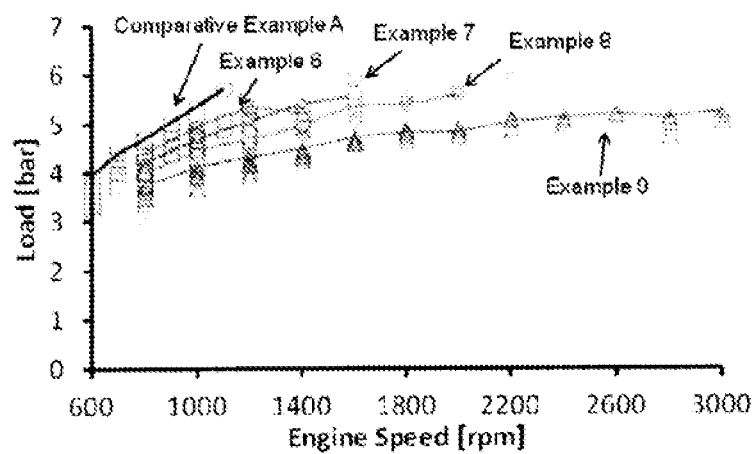
FIG. 2 is a graph illustrating the load versus engine speed, for the fuel compositions of Examples 6-9 and Comparative Example A.

FIG. 2 shows the operating map using a range of DTBP concentrations for the fuel compositions of Examples 6-9. Similar to FIG. 1, the output load is shown on the vertical axis, and the operating engine speed is shown on the horizontal axis. As can be seen, the fuel composition of Example 9 containing 5 vol % DTBP increased the engine speed from 1200 rpm to 3000 rpm, while the fuel composition of Example 8 containing 2 vol % DTBP increased the engine speed to 2000 rpm.

Figure 3:
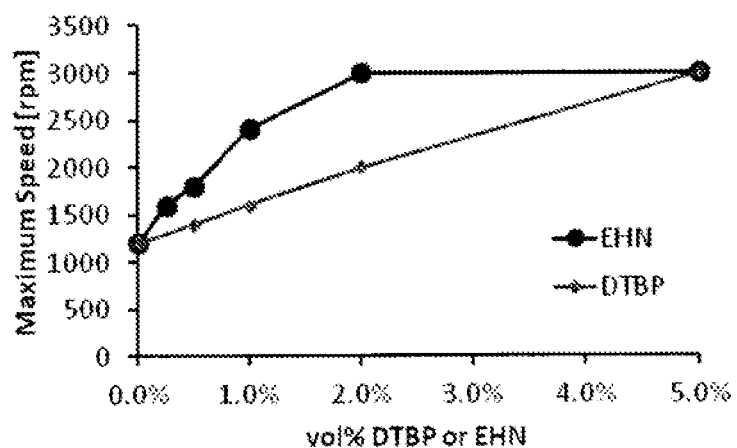
FIG. 3 is a graph illustrating the maximum speed obtained for the various concentrations of the cetane improvers 2-EHN and DTBP in the fuel compositions of Examples 1-9 and the fuel composition of Comparative Example A containing no cetane improver.
Figure 4:
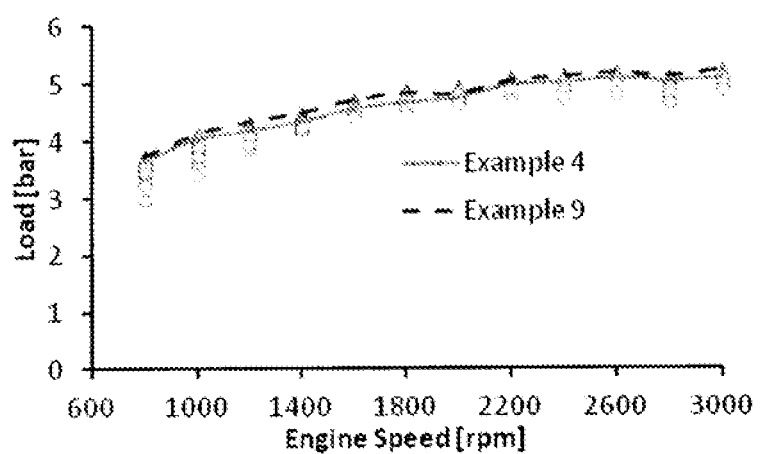
FIG. 4 is a graph illustrating the load versus engine speed for the fuel compositions of Examples 4 and 9.

FIG. 3 summarizes the maximum operating engine speeds for the various concentrations of 2-EHN and DTBP in "pump" gasoline. It can be seen that at a constant concentration, 2-EHN can generally result in a higher engine speed. FIG. 4 shows that the fuel compositions of Examples 4 and 9 containing 2 vol % 2-EHN and 5 vol % DTBP, respectively, have very similar operating maps.

Figure 5:
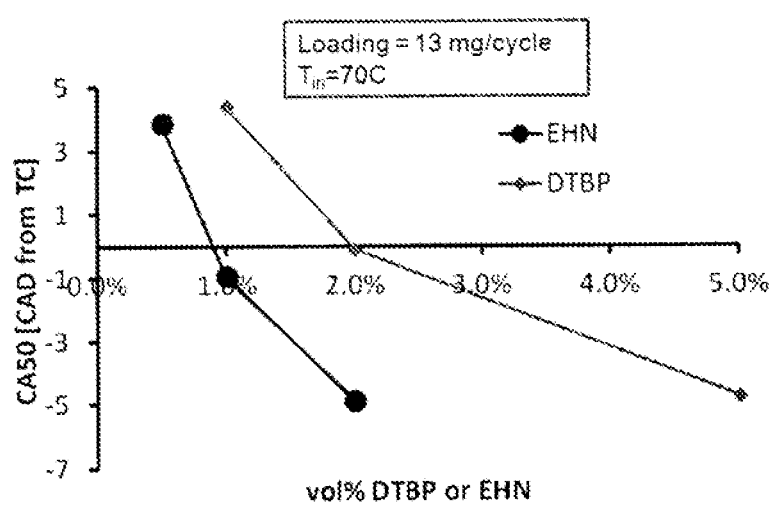
FIG. 5 is a graph illustrating the CA50 point for the fuel compositions of Examples 2-4 and 7-9.

Finally, a good measure of the impact of the cetane improver is to determine the location of the piston when 50% of the fuel in the engine burns (with a constant amount of fuel, constant intake temperature, and constant engine speed). This is known as the combustion phasing, or CA50 point. FIG. 5 shows that the CA50 point occurs later (i.e., takes longer to ignite) when comparing DTBP to 2-EHN at the same concentration.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A method for increasing a maximum operating speed of an internal combustion engine operated in a low temperature combustion mode, the method comprising operating the internal combustion engine in the low temperature combustion mode with a fuel composition comprising (a) a gasoline having a Research Octane Number (RON) greater than 85 and (b) one or more cetane improver additives, wherein the fuel composition allows the internal combustion engine to operate at a higher maximum operating speed.

2. The method of claim 1, wherein the internal combustion engine is operated in a premixed compression ignition combustion mode.

3. The method of claim 1, wherein the internal combustion engine is operated in a homogeneous charge compression ignition mode.

4. The method of claim 1, wherein the RON of the gasoline is greater than 85 and up to about 120.

5. The method of claim 1, wherein the RON of the gasoline is greater than 85 and up to about 100.

6. The method of claim 1, wherein the gasoline contains ethanol.

7. The method of claim 1, wherein the gasoline contains from about 0.5 up to about 20 vol. % ethanol.

8. The method of claim 1, wherein the one or more cetane improver additives are selected from the group consisting of nitrogen-containing cetane improver additives, nitrogen-free cetane improver additives, and mixtures thereof.

9. The method of claim 8, wherein the nitrogen-containing cetane improver additives are nitrate-containing cetane improver additives.

10. The method of claim 9, wherein the nitrate-containing cetane improver additives are selected from the group consisting of substituted or unsubstituted alkyl nitrates, substituted or unsubstituted cycloalkyl nitrates, nitrate esters of alkoxy substituted aliphatic alcohols, and mixtures thereof.

11. The method of claim 10, wherein the nitrate-containing cetane improver additives are selected from the group consisting of methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, 2-ethylhexyl nitrate, n-heptyl nitrate, sec-heptyl nitrate, n-octyl nitrate, sec-octyl nitrate, n-nonyl nitrate, n-decyl nitrate, n-dodecyl nitrate, isomers thereof and mixtures thereof.

12. The method of claim 10, wherein the nitrate-containing cetane improver additives are selected from the group consisting of cyclopentyl nitrate, cyclohexyl nitrate, methylcyclohexyl nitrate, cyclododecyl nitrate, isomers thereof and mixtures thereof.

13. The method of claim 10, wherein the nitrate esters of alkoxy substituted aliphatic alcohols are selected from the group consisting of 1-methoxypropyl-2-nitrate, 1-ethoxpropyl-2 nitrate, 1-isopropoxy-butyl nitrate, 1-ethoxylbutyl nitrate and mixtures thereof.

14. The method of claim 8, wherein the nitrogen-free cetane improver additives are selected from the group consisting of alkyl peroxides, aryl peroxides, alky aryl peroxides, acyl peroxides, peroxy esters, peroxy ketones, per acids, hydroperoxides and mixtures thereof.

15. The method of claim 8, wherein the nitrogen-free cetane improver additives are selected from the group consisting of di-tert-butyl peroxide, cumyl peroxide, 2,5-dimethyl-2,5-di(tertiary butylperoxy) hexane, tertiary butyl amyl peroxide, benzoyl peroxide, tertiary butyl peracetate, 3,6,9-triethyl-3,9-trimethyl-1,4,7-triperoxononan, 2,2- di(teriary butyl) butane, peroxy acetic acid, tertiary butyl hydroperoxide and mixtures thereof.

16. The method of claim 1, wherein the one or more cetane improver additives is 2-ethylhexyl nitrate.

17. The method of claim 1, wherein the one or more cetane improver additives is di-tert-butyl peroxide.

18. The method of claim 1, wherein the one or more cetane improver additives are present in the fuel composition in an amount ranging from about 0.1 to about 5.0 wt. %.

19. The method of claim 16, wherein the 2-ethylhexyl nitrate is present in the fuel composition in an amount ranging from about 0.1 to about 5.0 wt. %.

20. The method of claim 16, wherein the 2-ethylhexyl nitrate is present in the fuel composition in an amount ranging from 0.25 to about 5 wt. %.

21. The method of claim 17, wherein di-tert-butyl peroxide is present in the fuel composition in an amount ranging from about 0.1 to about 5.0 wt. %.

22. The method of claim 17, wherein di-tert-butylperoxide is present in the fuel composition in an amount ranging from about 0.25 to about 5.0 wt. %.

23. The method of claim 1, wherein an amount of the one or more cetane improver additives added to the fuel composition during engine operation is dependent on one or more of engine speed, power output (load), boost level, or % EGR.

24. The method of claim 1, wherein the internal combustion engine is operated at an intake pressure of 100 kPa.

25. The method of claim 1, wherein the internal combustion engine is operated at an intake pressure of about 100 kPa to about 400 kPa.

26. The method of claim 1, wherein the one or more cetane improver additives are nitrate-containing cetane improver additives.

* * * * *